US006845353B1

(12) United States Patent
Bedichek et al.

(10) Patent No.: US 6,845,353 B1
(45) Date of Patent: Jan. 18, 2005

(54) INTERPAGE PROLOGUE TO PROTECT VIRTUAL ADDRESS MAPPINGS

(75) Inventors: Robert Bedichek, Palo Alto, CA (US); David Keppel, Seattle, WA (US); John Banning, Sunnyvale, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/471,447

(22) Filed: Dec. 23, 1999

(51) Int. Cl.[7] ................................................ G06F 9/455

(52) U.S. Cl. ............................. 703/26; 703/23; 703/27; 712/209; 714/53; 717/138

(58) Field of Search ............................. 703/26, 27, 23; 712/209; 714/53; 717/138

(56) References Cited

U.S. PATENT DOCUMENTS 4,434,459 A 2/1984 Holland et al. ............. 364/200
4,951,195 A * 8/1990 Fogg et al. ................... 703/20
5,167,023 A * 11/1992 de Nicolas et al. ........... 703/21
5,313,614 A * 5/1994 Goettelmann et al. ...... 717/138
5,361,389 A 11/1994 Fitch .......................... 395/375
5,832,205 A 11/1998 Kelly et al. ............ 395/185.06
5,875,318 A * 2/1999 Langford ..................... 714/31
6,163,764 A * 12/2000 Dulong et al. .............. 711/206
6,363,336 B1 * 3/2002 Banning et al. .............. 703/26
6,415,379 B1 * 7/2002 Keppel et al. ................ 703/26

* cited by examiner

*Primary Examiner*—Thai Phan
*Assistant Examiner*—Herng-der Day

(57) ABSTRACT

In a computer which translates instructions from a target instruction set to a host instruction set, a method for determining validity of a translation of a target instruction linked to an earlier translation including the steps of testing a memory address of a target instruction to be executed against a copy of the memory address of the target instruction from which a translation of the target instruction was made, executing the translation if the addresses compare, and generating an exception if the addresses do not compare.

14 Claims, 4 Drawing Sheets

INTERPAGE PROLOGUE TO PROTECT VIRTUAL ADDRESS MAPPINGS

BACKGROUND OF THE INVENTION

1. Field of the Invention

This invention relates to computer systems and, more particularly, to methods and apparatus for assuring consistency of translated instructions being executed by a microprocessor which dynamically translates instructions from a target to a host instruction set.

2. History of the Prior Art

Recently, a new microprocessor was developed which combines a simple but very fast host processor (called a "morph host") and software (referred to as "code morphing software") to execute application programs designed for a processor having an instruction set different than the instruction set of the morph host processor. The morph host processor executes the code morphing software which translates the application programs dynamically into host processor instructions which are able to accomplish the purpose of the original software. As the instructions are translated, they are stored in a translation buffer where they may be executed without further translation. Although the initial translation of a program is slow, once translated, many of the steps normally required for hardware to execute a program are eliminated. The new microprocessor has proven able to execute translated "target" programs as fast as the "target" processor for which the programs were designed.

The new microprocessor is described in detail in U.S. Pat. No. 5,832,205, Memory Controller For A Microprocessor For Detecting A Failure Of Speculation On The Physical Nature Of A Component Being Addressed, Kelly et al, Nov. 3, 1998, assigned to the assignee of the present invention.

One reason that the new processor is able to execute programs rapidly is its ability to link together sequences of translations that occur frequently into very long sequences. Linking eliminates many of the steps which would be necessary to retrieve individually the various translations for execution. The process by which this is accomplished is explained in detail in the above-mentioned patent.

One problem that must be resolved for a computer which executes host translations of a target program is that the target program typically defines the sequences of target instructions which are to be executed by presenting a series of addresses at which those instructions are stored to the central processor as those target instructions are to be executed. The central processor reads the address of the instruction next to be executed, fetches that instruction from memory, and executes the instruction. When the target program being executed is defined by such a sequence of addresses yet the instructions being executed are host translations of those instructions which reside at other addresses, it is necessary to determine that each translated host instruction is, in fact, the result of a translation from a target instruction which is at the address (including the effect of address mapping) presented by the target program for execution.

This is an especially difficult problem where sequences of translated instruction have been linked together in the manner described above in order to attain rapid execution.

It is desirable to improve the operation of a computer system which utilizes a microprocessor that translates programs dynamically from target instructions into host instructions able to accomplish the purpose of the original software by rapidly determining that a host instruction is a translation of a target instruction presented for execution.

SUMMARY OF THE INVENTION

It is, therefore, an object of the present invention to improve the operation of a computer system which utilizes a microprocessor to translate programs dynamically from target instructions into host microprocessor instructions able to accomplish the purpose of the original software by rapidly determining that a host instruction is a translation of a target instruction presented for execution.

This and other objects of the present invention are realized in a computer which translates instructions from a target instruction set to a host instruction set by a process for testing the memory address of a target instruction to be executed against a copy of the memory address of the target instruction from which a translation of the target instruction was made, executing the translation if the addresses compare, and generating an exception if the addresses do not compare.

These and other objects and features of the invention will be better understood by reference to the detailed description which follows taken together with the drawings in which like elements are referred to by like designations throughout the several views.

DETAILED DESCRIPTION

Figure 1:
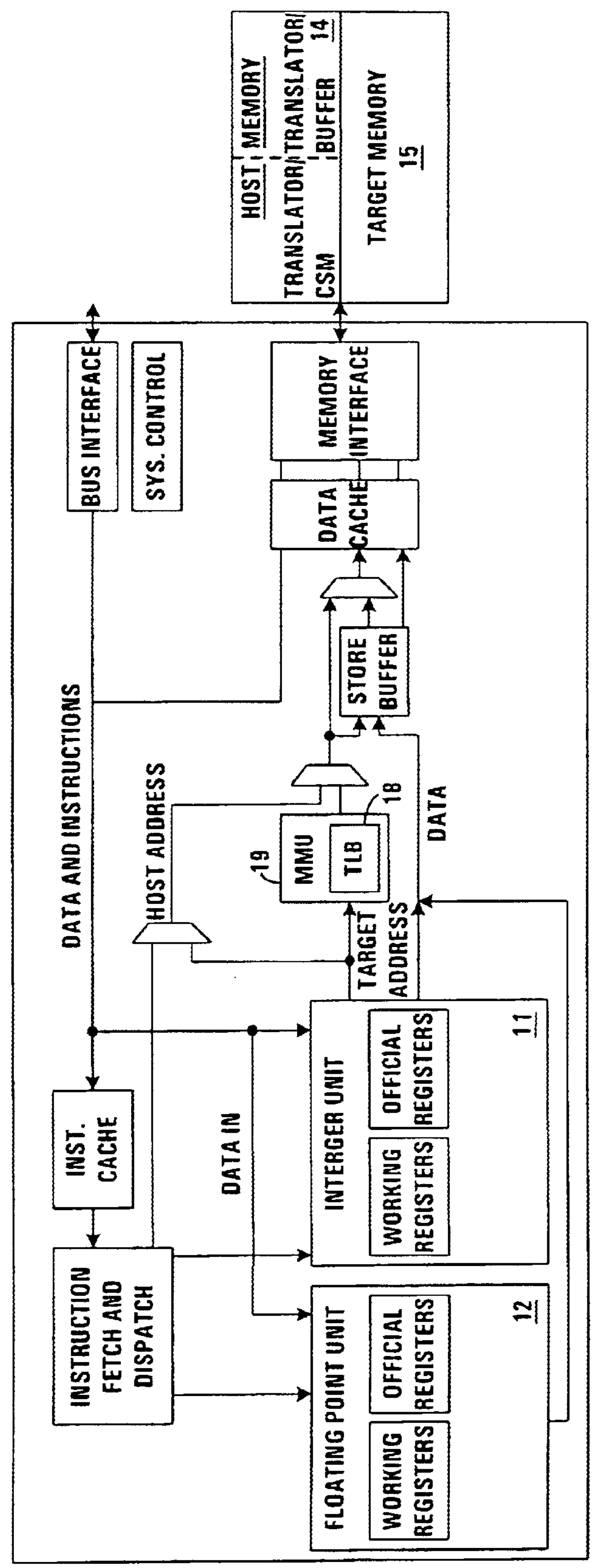
FIG. 1 is a block diagram illustrating a new microprocessor which is adapted to carry out the present invention.

FIG. 1 illustrates a microprocessor 11 which may utilize the present invention. The microprocessor pictured is described in detail in U.S. Pat. No. 5,832,205. The microprocessor includes a floating point unit 12, an integer unit 13, a translation buffer 14 which is a part of system memory, target memory 15 which is another portion of system memory, and a translation lookaside buffer 18 which is a part of a memory management unit 19.

As described above, the new microprocessor translates target instructions into host instructions which it executes. The target instructions are stored at addresses in a target portion of system, memory while translated host instructions are stored at different addresses in a host portion of system memory. When a target program is being executed, an instruction pointer pointing to the address of each sequential target instruction to be executed is provided in an EIP register. The new processor reads the instruction pointer, determines the address of the target instruction, and decides whether a host translation exists for that instruction. If no translation exists, then a new translation is generated, stored in host memory, and executed.

If a translation exists, the code morphing software finds the translation and executes it. If the translation is not linked to any other translations, then after it has been executed software determines the next target instruction from the next instruction pointer (often herein referred to as the EIP value) in the EIP register, determines whether a translation exists for this next target instruction, and continues with the process in the manner just described.

On the other hand, if the translation which is being executed is linked to other translations, then the next host instruction to be executed is not determined by the target instruction EIP value. Instead, the next host instruction is determined by a jump command to the next translation placed at the end of the executing translation by a linking process of the code morphing software.

In each case in which a next host translation is to be executed, it is important for the software to ascertain that the translation which is to be executed is a translation of the target instruction commanded by the target program which is being executed by means of the host translation and that both the target instruction EIP value and the physical address it maps to correspond and are correct. The translation to be executed must be a translation of the target instruction to which the EIP value points and which is stored at the physical address the EIP maps to if execution is to produce a correct result.

In order to be able to ascertain that the translation which is to be executed is a translation of the target instruction pointed to by the EIP value and stored at the physical address the EIP value maps to, the present invention stores for each translation the physical address in memory of the target instruction from which the translation was made, the EIP of that target instruction, and various context relating to: the translation not pertinent to the present invention.

Figure 2:
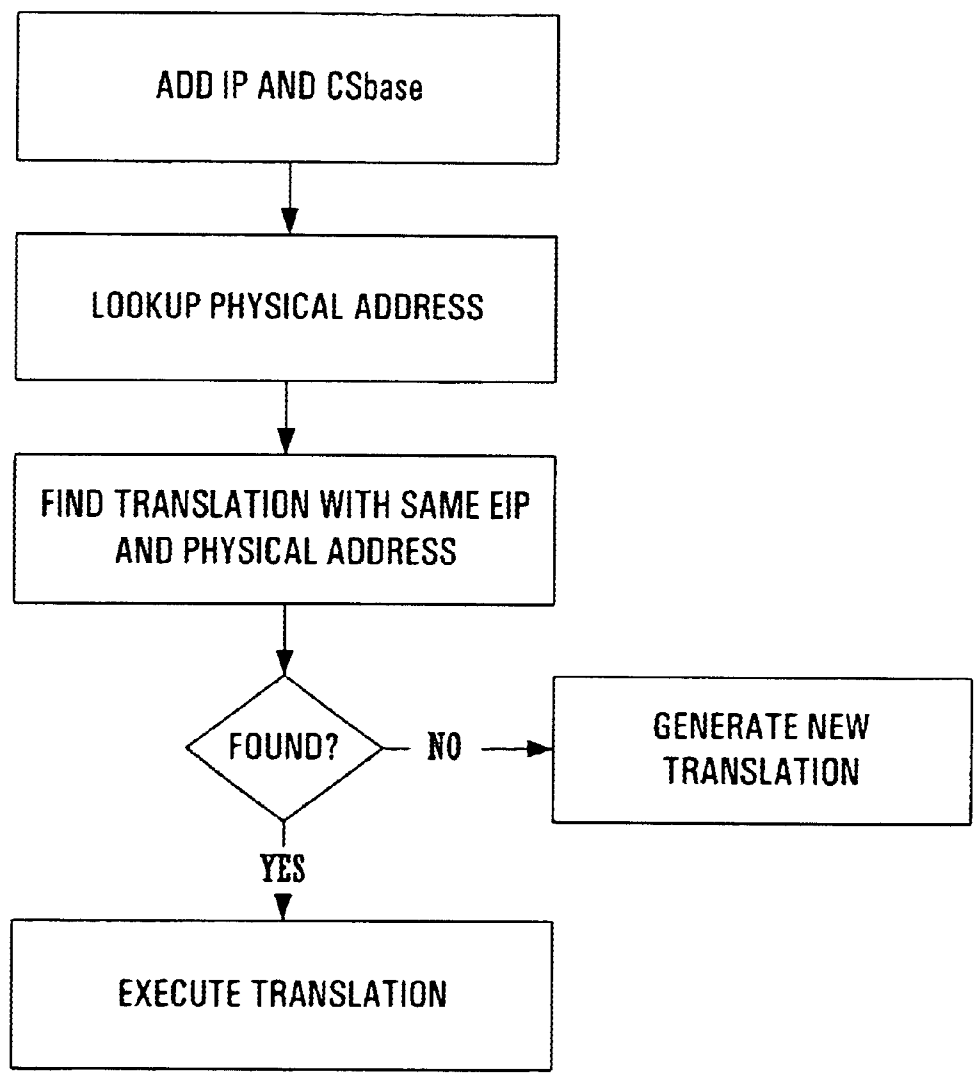
FIG. 2 is a diagram illustrating some of the steps of a process for carrying out the invention.

When the instruction to be executed is being "dispatched" (responding to the next target instruction of the target program), the operation proceeds in a straightforward manner as shown in FIG. 2. The code morphing software simply maps the EIP value to a physical address and finds the translation with the same EIP value and physical address. To accomplish this, the value in the EIP register is furnished to the code morphing software. The code morphing software adds the code segment base and the EIP value and furnishes the result to the translation lookaside buffer circuitry. The translation lookaside buffer circuitry utilizes this logical address to determine the physical page address pointed to by the EIP value. The physical page address and the low order bits of the sum of the code segment base and the EIP value are then combined to provide the physical address of the target instruction. With this physical address, a translation is found that matches this physical address and EIP value. If such a translation is found, control is transferred to it. If none is found, a new translation is made of the target instructions starting at that EIP value and physical address.

However, when a first host translation is linked to one or more succeeding translations, the operation is much more complicated. Although the EIP value of the first translation in the sequence will have been used to check that its physical address and the physical address stored with the first host translation are in fact the same, the next translation (translated instruction) is reached by a linking jump instruction which completes the execution of the first translation. Since such a jump instruction does not return control to the dispatching portion of the program but rather intentionally eliminates that portion of the program in order to attain speed, no check would normally be made to determine that the host instruction is a translation of the target instruction stored at the memory address pointed to by the EIP value at the physical address mapped to by the EIP value.

Because the EIP value is changed in a fixed and predictable manner, it can be guaranteed that the EIP value of the second translation is correct when the two translations are chained together. However, the mapping of the EIP value of the second translation to a physical address may not be the same as the mapping of the EIP value of the first translation to a physical address so something must be done to assure that the mapping of the EIP value of the second translation is to the physical address of the second translation.

The present invention assures that such check is, in fact, carried out by providing a process for accomplishing the consistency test in all situations where required. The jump instruction which accomplishes the linking is caused to point to a process which accomplishes the check and then moves to the linked translation if the test is met. If the test is not met, an exception is generated; and various solutions may be provided. It should be noted that the process of the present invention also provides a solution to situations in which an operating system has for some reason unmapped a particular memory page at which translated target instruction are stored. The prologue process will indicate a failure when its test is conducted so that the link to the next translation will not be executed. At that point, the code morphine software may roll back execution to the last consistent point from which some other method for executing the target instructions may take place.

Figure 3:
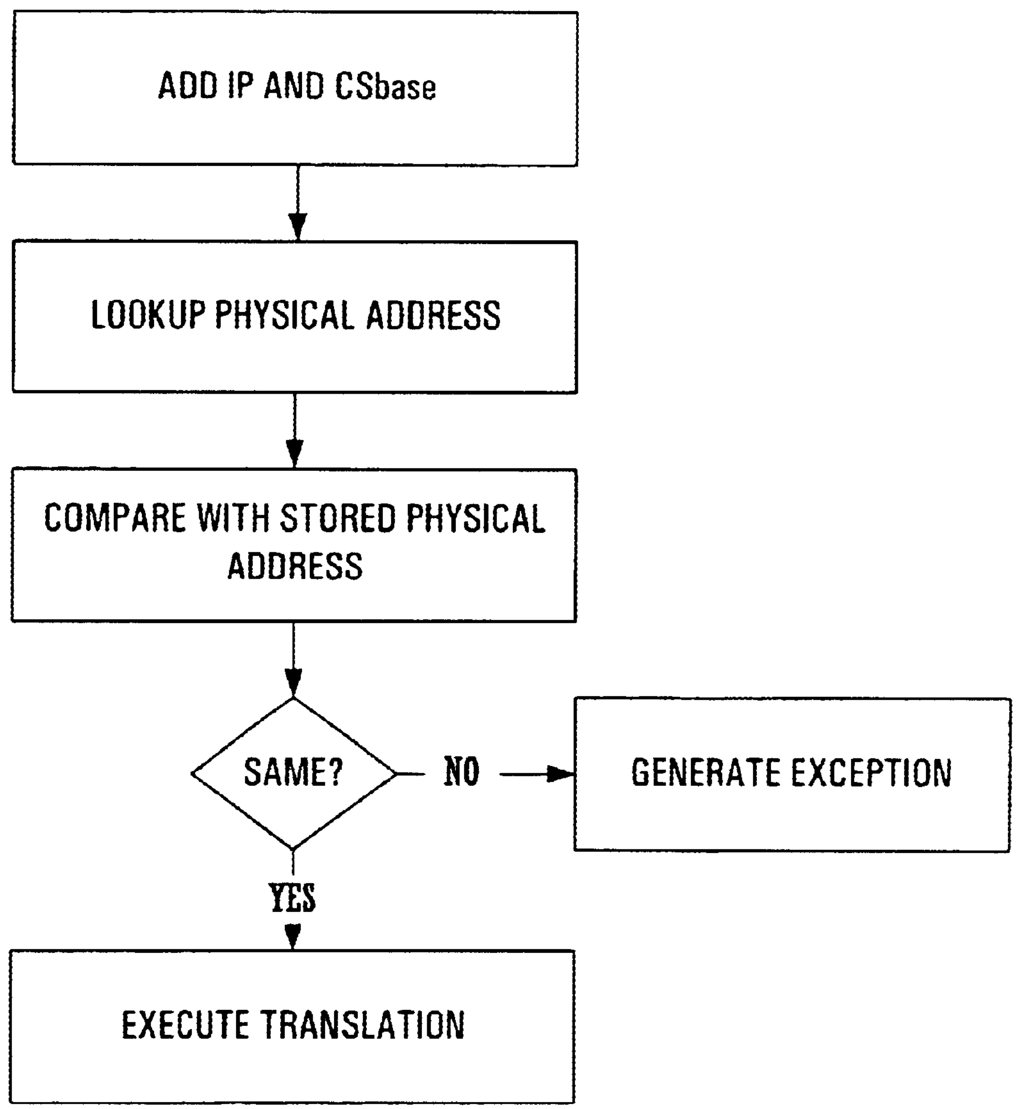
FIG. 3 is a diagram illustrating some of the steps of another process for carrying out the invention.

In one embodiment of the invention, the process (shown in FIG. 3) for accomplishing the check utilizes the EIP value designating the next target instruction and the code segment base to determine the virtual address pointed to by the EIP value, determines the physical address of the target instruction by a lookup, and then compares this physical address with the physical address of the target instruction stored for the translation. If the addresses are the same, the linked translation is executed. If the addresses differ, an exception is generated; and execution is rolled back to the last point at which consistent state existed and some other method of executing the target instruction is undertaken. At that point, the succeeding translation can be invalidated; and another translation or an interpretation of the target instructions can be undertaken. Alternatively, the succeeding translation may remain valid, but its link to the preceding translation broken so that the first translation no longer proceeds directly to the second.

The need for this general test may be eliminated if the EIP value for the succeeding translation maps to an address on the same memory page as the EIP stored for the preceding translation because the consistency test will already have been conducted for the memory page and the prior translation will not have changed the mapping. If the logical addresses are on the same memory page, then the physical addresses are also on the same memory page. The information to determine this is available from the EIP values of the preceding and succeeding translations and the physical address of the first target instruction of the preceding translations. The EIP value furnished by the target program and the physical address provide sufficient information to determine whether the stored EIP values saved for the host translation are on the same memory page.

Figure 4:
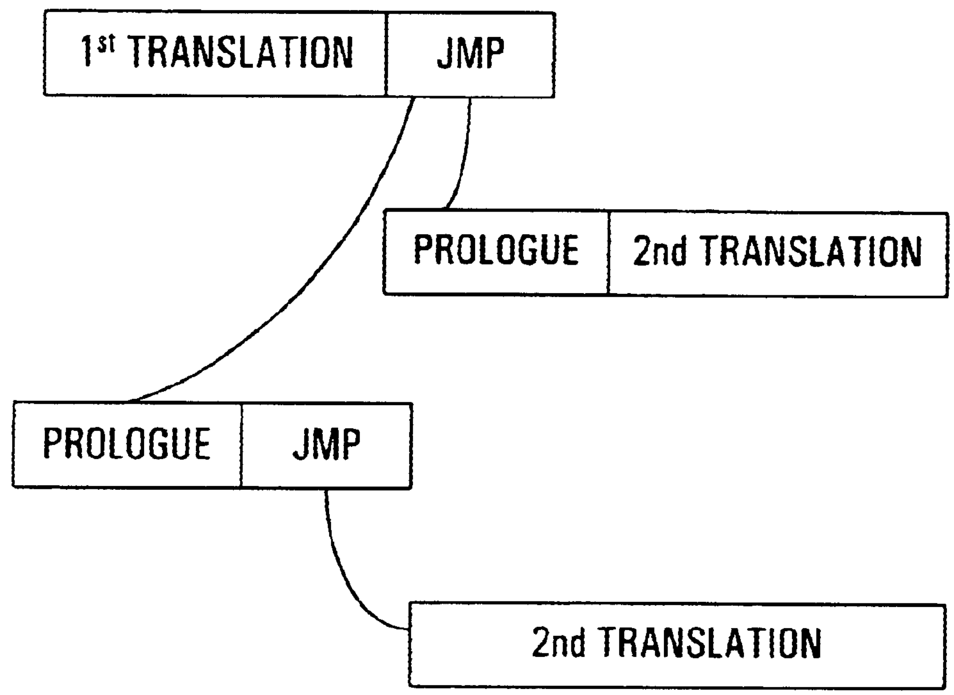
FIG. 4 is another diagram illustrating the steps of a general process for carrying out the invention.

The process of the present invention may be utilized in at least two distinct ways which are both shown in FIG. 4 of the drawing. If it is known that the translation will be linked to a previous translation when it is translated and a check of the physical address is required, then the prologue process (described above and illustrated in FIG. 3) may be included in the translation. In such a case, the preceding translation merely jumps to the next translation where the address consistency process of the prologue is executed before the translation is executed.

If, on the other hand, it is not known when the translation is made whether it will be linked to another translation or not, then the prologue process is generated as a separate short prologue when the linking of the two translations occurs. At this time, the preceding translation is provided a jump instruction to the prologue process; and the prologue completes (if the test is met) with another jump instruction to the succeeding translation.

Another manner of utilizing the prologue process would be to incorporate what started as a separate prologue into a linked translation at the time of linking.

A single translation may include translations from target code which appears on two different pages. In this case, the translation must include code for performing the EIP mapping and physical address consistency check described above for target instructions on any: page other than the page of the first target instruction.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of determining validity of a translated instruction comprising:

a) starting execution of a succeeding host instruction translated from a first target instruction, wherein said succeeding host instruction is linked via a jump command from a preceding host instruction translated from a second target instruction, and wherein a first condition of a target system state required by said first succeeding host instruction holds, wherein said first condition is based on an address consistency check of said preceding host instruction;

b) testing a second condition of said target system state to determine the validity of said succeeding host instruction;

c) executing said succeeding host instruction if said second condition holds; and d) generating an exception if said second condition does not hold.

2. The method of claim 1, wherein said b) comprises performing an address consistency check of said succeeding host instruction.

3. The method of claim 2, wherein said b) comprises comparing a physical address of said first target instruction against an address stored in said succeeding host instruction.

4. The method of claim 1, wherein said first condition is that an address stored in said preceding host instruction matches a physical address of said second target instruction.

5. The method of claim 4, wherein said b) comprises verifying that an address stored in said succeeding host instruction matches a physical address of said first target instruction.

6. The method of claim 1, wherein said d) further comprises invalidating said succeeding host instruction.

7. The method of claim 1, wherein said d) further comprises removing said jump command between said succeeding host instruction and said preceding host instruction.

8. The method of claim 1, wherein said d) further comprises creating a new translation of said first target instruction.

9. The method of claim 1, wherein said d) further comprises interpreting said first target instruction.

10. A method of determining validity of a translated instruction comprising:

a) performing a first address consistency check of a first host instruction made from a first target instruction to verify that said first host instruction is valid;

b) executing said first host instruction;

c) determining whether a second host instruction made from a second target instruction and that is linked via jump command from said first host instruction can be safely executed without a second address consistency check by determining whether said first and second target instructions are on a same memory page; and d) executing said second host instruction without performing said second address consistency check if safe.

11. The method of claim 10, further comprising:

e) performing said second address consistency check if said determination is that it is unsafe to execute said second host instruction without said second address consistency check; and f) executing said second host instruction if said second address consistency check passes.

12. A method of linking translated instructions comprising:

a) translating a first target instruction to a first host instruction;

b) translating a second target instruction to a second host instruction;

c) determining at the time said translation of said second target instruction is made that said first and second host instructions are to be linked; and d) providing an address consistency check for said second host instruction by:

linking said first host instruction to said second host instruction via a jump command; and including code for performing said address consistency check as a part of said second host instruction.

13. A method of translated instructions comprising:

a) translating a first target instruction to a first host instruction;

b) translating a second target instruction to a second host instruction;

c) determining after said translation of said second target instruction is made that said first and second host instructions are to be linked; and d) providing an address consistency check for said second host instruction by:

linking said first host instruction to code for performing said address consistency check via a first jump command; and linking said code for performing said address consistency check to said second host instruction via a second jump command.

14. A method of linking translated instructions comprising:

a) translating a first target instruction to a first host instruction;

b) translating a second target instruction to a second host instruction;

c) determining after said translation of said second target instruction is made that said first and second host instructions are to be linked; and c) comprises:

d) providing an address consistency check for said second host instruction by:

linking said first host instruction to said second host instruction via a jump command; and incorporating code for performing said address consistency check into said second host instruction.

* * * * *